3,395,123
METHOD FOR PREPARING A POLYMER WHICH IS
A PRODUCT OF CONDENSATION OF KETONES
WITH DITHIOLPOLYTHIOETHERS
Bernard Audouze, Pau, France, assignor to Societe Nationale des Petroles d'Aquitaine, Paris, France
No Drawing. Filed Nov. 12, 1964, Ser. No. 410,688
Claims priority, application France, Nov. 12, 1963,
953,327
4 Claims. (Cl. 260—63)

ABSTRACT OF THE DISCLOSURE

This invention relates to a process for the preparation of condensation products of ketones and dithiolpolythioethers and, more particularly, to such a process which consists of mixing at least one ketone with polythioformaldehyde and with a catalytical amount of a strong acid and maintaining the temperature in the range from —20° C. to 100° C. until a condensation product is formed.

The condensation products of dithiols with ketones have long been known. These products, prepared by the known methods, have not so far found any important industrial applications. On the other hand, the new polymers according to the invention are useful as starting material for the preparation of different plastic materials, as for example the polycondensation with diisocyanates; they are of particular interest as plasticizers of sulphur, which they are able to transform into a plastic composition having very good characteristics.

According to the invention, the new polycondensates are products of the reaction of one or more ketones with one or more polythioformaldehydes, that is to say, with dithiolpolythioethers, of which the formula can be written diagrammatically

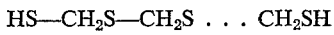

or

wherein $n$ is equal to at least 2 and usually at least 3.

In the polythioformaldehydes which enter into the composition of the polymers according to the invention, $n$ can vary between fairly large limits. However, in the industrial applications hereinbefore referred to, very good results are obtained with the liquid oligomers of which the number $n$ of —$CH_2S$— groups is from 2 to 7 or inbefore referred to, very good results are obtained with the liquid oligomers of which the number $n$ of —$CH_2S$— groups is from 2 to 7 or better still from 3 to 4.

Although the exact structure of the new condensation products according to the invention has still not been accurately established, it certainly seems that these products are mercaptols. They can contain, per mol of dithiopolythioether, 1 ketone radical combined with the polythioformaldehyde chain; excellent industrial results are obtained with polycondensates in which each ketone radical corresponds to 1 molecule of polythioformaldehyde containing 3 to 4 —$CH_2S$— groups.

Products which are of very great interest in practice are obtained from the condensation of 1 molecule of ketone, for example acetone, with mixtures of polythioformol containing several oligomers, particularly compounds with 2, 3, 4 and 5 —$CH_2S$— groups, these being compounds of which the average number $n$ is between 3 and 4.

Depending on the qualities which are desired of the polycondensate, it is possible to select a polymer in which a single ketone is condensed with the polythioformaldehyde, or even a polymer of which the polythioformaldehyde chain is condensed at the same time with several different ketones; thus, for example, polycondensates originating at the same time from acetone, and cyclohexanone, isobutylketone and benzophenone, etc., form part of the invention.

According to the nature of the ketone and the thioformaldehyde polymer involved in the composition of the polycondensate according to the invention, it is possible to have products of which the physical properties vary and which are liquid or more or less compact. With the oligomers having 3 to 4 groups, more or less viscous liquids are obtained, depending on the nature of the ketone; these products are generally colourless or exhibit a pale yellow colour and do not have any unpleasant odour.

The process according to the invention for the preparation of the new condensation products consists in bringing one or more ketones into contact with one or more liquid polythioformaldehyde in the presence of an acid catalyst at a temperature which is between —20° C. and 100° C.

The reaction is substantially instantaneous, at every temperature; nevertheless it is preferable to continue stirring the reaction mixture during about one hour to complete the reaction.

The preparation may be carried out in making the ketone react with the polythioformaldehyde directly or in a solvent; this second procedure is preferred as it provides a more homogeneous medium.

When the operation is carried out without a solvent, the temperature of the reaction increases as the catalyst (sulphuric acid) is introduced; the temperature must be controlled in order that it does not exceed 100° C. When the reaction is carried out in a solvent, the latter regulates and limits the increase of temperature due to the addition of catalyst. The operation may take place at a temperature near the boiling point of the solvent used, but very good results are obtained by cooling the solution to about 0°.

Various solvents may be used, particularly aromatic hydrocarbons, such for example as benzene, toluene, xylene, ethyl-benzene etc., while those which boil below or at about 100° C. are more suitable.

Though polythioformaldehydes may be used having the number $n$ of groups —$CH_2S$— variable from 2 to 5, the preferred operating procedure consists in reacting the ketone with a liquid polythioformaldehyde, particularly an oligomer the number $n$ of which is 3 to 4, that is a polymer having a molecular weight of approximately 172 to 218.

As catalysts, inorganic or organic acids may be used, eventually admixed with inorganic salts. Preferably liquid or gaseous strong acids are used, such as for example sulfuric, phosphoric or gaseous hydrochloric acid; these acids may be used alone or in admixture with anhydrous zinc chloride or other Lewis acid salts.

When ketone and polythioformaldehyde are reacted directly, that means in the absence of solvent, the amount of ketone used is preferably in little excess over the above mentioned stoichiometrical proportion; then, as the reaction is completed, the polymer is separated by decantation from a supernatant layer.

In the case where the reaction is carried out in a solvent, one single homogenous solution is generally obtained. On completion of the operation the solvent may be separated by distillation.

A preferred procedure consists in precipitating the polymer by adding a non-solvent, such as methanol for example, to the solution; the precipitate formed is then separated from the liquid, and it is washed with a fresh portion of the non-solvent. While methanol is particularly suitable, other alcohols may be used as the non-solvents, and preferably lower aliphatic alcohols.

The molecular ratios between the ketone and the polythioformaldehyde can vary, but it is generally to be recommended to use about 1 to 1.5 molecules of ketone for 1 mole of oligomer comprising 3 to 4 —CH$_2$S— groups.

The process according to the invention may be carried out with ketones of very different types or with mixtures of the different ketones. As a non-limiting example, the following ketones may be mentioned: acetone, ethylmethylketone, diethylketone or 3-pentanone, methylisobutylketone, hexanones, heptones, octanones, benzophenone, acetophenone, acetonylacetone, acetophenone-acetone, acetylacetone, fluorenone or diphenylene acetone, phenylacetophenones, cyclopentanone, cyclohexanone, methylcyclohexanone, etc. Ketones having molecular weights of 58 to 200 are very suitable.

The invention is illustrated in non-limiting manner by the following examples, in which the different ketones have been condensed with a polythioformaldehyde, i.e., dithiolpolythioether, a colourless liquid with a molecular weight in the region of 190.

EXAMPLE I

In a spherical flask equipped with a reflux condenser, 950 parts by weight of dithiopolythioether are dissolved in 360 parts by weight of acetone. 70 parts by weight of concentrated sulphuric acid are slowly added dropwise. The temperature rises to 70° C. The mixture is kept at this temperature without stirring for 1 hour. Decantation then takes place and the lower part is withdrawn, this being then washed until neutral with boiling water. 1000 parts of a colourless viscous liquid are obtained.

EXAMPLE II

In a spherical flask equipped with a reflux condenser, 950 parts of dithiolpolythioether are dissolved in 400 parts of methylethylketone. 64 parts of concentrated sulphuric acid are added dropwise and the temperature rises to 95°. The mixture is kept at this temperature while stirring for 1 hour. Decantation then takes place and the lower part is withdrawn, this being washed until neutral with boiling water. The product thus obtained is formed by 1100 parts of a colourless viscous liquid.

EXAMPLE III

In a spherical flask equipped with a reflux condenser, 950 parts of dithiolpolythioether are dissolved in 500 parts of cyclohexanone, 64 parts of concentrated sulphuric acid are slowly added dropwise and the mixture is kept at a temperature of 100° C. for 1 hour. Decantation takes place and the lower part is washed with boiling methanol and with boiling water. 1250 parts of a transparent, slightly yellow and very viscous liquid are obtained.

EXAMPLE IV

In a spherical flask equipped with a reflux condenser, 350 parts of acetone are dissolved in 879 parts of benzene. This solution is cooled to —5° and dry gaseous HCl is caused to bubble slowly therethrough while stirring. A solution of 950 parts of dithiolpolythioether dissolved in 1320 parts of benzene is slowly added, the temperature being kept at —5° C. After adding the benzene solution, 1000 parts of a viscous colourless liquid are precipitated by adding 400 parts of methanol.

EXAMPLE V

Using an apparatus similar to that previously used, 550 parts of methylisobutylketone are dissolved in 879 parts of benzene. The solution is cooled to —10° C. and dry gaseous HCl is caused to bubble slowly therethrough while stirring. A solution of 950 parts of dithiolpolythioether in 1320 parts of benzene is slowly added thereto, the temperature being kept at —10° C. At the end of the reaction, 1170 parts of very viscous colourless liquid are precipitated by 400 parts of methanol.

EXAMPLE VI

In an apparatus similar to that used above, 616 parts of methylcyclohexanone are dissolved in 879 parts of benzene. The solution is cooled to 0° C. and dry gaseous HCl is caused to bubble slowly therethrough while stirring. A solution of 950 parts of dithiolpolythioether in 1320 parts of benzene is slowly added thereto, the temperature being kept at 0° C. At the end of the reaction, 400 parts of methanol are added and, by decantation, there are obtained 1200 parts of a very viscous liquid which is slightly yellowish in colour.

EXAMPLE VII

In an apparatus similar to that used above, 660 parts of acetophenone are dissolved in 879 parts of benzene. The solution is cooled to —5° C. 10 parts of anhydrous zinc chloride are added to this solution and dry gaseous HCl is caused to bubble slowly therethrough. A solution of 950 parts of dithiolpolythioether in 1320 parts of benzene is slowly added, the temperature being kept at —5° C. At the end of the reaction, 400 parts of methanol are added and 1350 parts of a colourless, very viscous liquid are decanted off.

EXAMPLE VIII

In an apparatus similar to that used above, 1000 parts of benzophenone are dissolved in 1320 parts of benzene and the solution is cooled to 0° C. 10 parts of anhydrous zinc chloride are added and dry gaseous HCl is caused to bubble therethrough. A solution of 950 parts of dithiolpolythioether in 879 parts of benzene is slowly added, the temperature being kept at 0° C. After the reaction, 400 parts of methanol are added and a very viscous liquid of pale yellow colour is decanted off.

EXAMPLE IX

The working method is similar to that of Example IV, but using a temperature of 50° C.

I claim:

1. Method for preparing a polymer which is a product of condensation of a ketone with a polythioformaldehyde, which consists in mixing at least one ketone selected from the class consisting of acetone, isobutylketone, benzophenone, ethylmethylketone, diethylketone, methylisobutylketone, linear hexanones, heptanones, octanones, acetophenone, acetonylacetone, acetophenone-acetone, acetylacetone, fluorenone, phenylacetophenones, cyclopentanone, cyclohexanone, and methylcyclohexanone, the molecular weight of which is in the range from 58 to 100, with a polythioformaldehyde which is liquid at ambient temperature and the molecule of which contains 3 to 4 groups —CH$_2$S—, the molar ratio of ketone to polythioformaldehyde being 1 to 1.5, with a catalytical amount of a strong acid, and with a solvent capable of dissolving the ketone, the polythioformaldehyde and the acid, keeping the solution thus obtained at a temperature of —20° C. to 100° C. until the polythioformaldehyde is condensed with a ketone to form a polymer and separating the polymer from the solvent.

2. Method according to claim 1, in which said solvent is an aromatic hydrocarbon selected from the group consisting of benzene, ethylbenzene, toluene and xylene.

3. Method according to claim 3, in which the polymer is separated from the solvent by adding thereto an amount of lower aliphatic alcohol sufficient to precipitate the polymer.

4. A process for preparing a polymer consisting of a condensation product of a ketone and a polythioformaldehyde, consisting of the steps of mixing at least one ketone selected from the class consisting of acetone, isobutylketone, benzophenone, ethylmethylketone, diethylketone, methylisobutylketone, linear hexanones, heptanones, octanones, acetophenone, acetonylacetone, acetophenone-acetone, acetylacetone, fluorenone, phenylacetophenones, cyclopentanone, cyclohexanone, and methylcyclohexanone having a molecular weight which is in the range from 58 to 100 with a polythioformaldehyde which is liquid at ambient temperature and the molecule of which contains three to four —$CH_2S$— groups with a catalytic amount of a strong acid and with a catalytic amount of anhydrous zinc chloride, and maintaining the mixture at a temperature in the range from —20° C. to 100° C. until the polymer is formed, the acid being selected from the class consisting of liquid sulfuric acid, liquid phosphoric acid, and gaseous hydrochloric acid.

References Cited
UNITED STATES PATENTS

| | | | |
|---|---|---|---|
| 1,960,262 | 5/1934 | Dreyfus et al. | 260—3 |
| 3,303,166 | 2/1967 | Bapseres et al. | 260—67 |

WILLIAM H. SHORT, *Primary Examiner.*

L. LEE, *Assistant Examiner.*